(12) United States Patent
Brieschke (10) Patent No.: US 8,823,229 B2
(45) Date of Patent: Sep. 2, 2014

(54) ELECTRO-MECHANICAL ACTUATOR

(75) Inventor: Todd M. Brieschke, Ottawa Lake, MI (US)

(73) Assignee: Aries Engineering Company, Inc., Dundee, MI (US)

( * ) Notice: Subject to any disclaimer, the term of this patent is extended or adjusted under 35 U.S.C. 154(b) by 308 days.

(21) Appl. No.: 13/152,954

(22) Filed: Jun. 3, 2011

(65) Prior Publication Data
US 2011/0298323 A1    Dec. 8, 2011

Related U.S. Application Data

(60) Provisional application No. 61/351,335, filed on Jun. 4, 2010.

(51) Int. Cl.
| H02K 7/06 | (2006.01) |
| H02K 7/10 | (2006.01) |
| F16H 19/02 | (2006.01) |
| H02K 7/116 | (2006.01) |

(52) U.S. Cl.
CPC .............. *H02K 7/116* (2013.01); *F16H 19/025* (2013.01); *F16H 19/02* (2013.01)
USPC .............. 310/83; 310/12.19; 310/15; 310/80; 310/90; 310/91; 74/25

(58) Field of Classification Search
CPC ........... H02K 7/116; H02K 7/06; H02K 7/10; F16H 19/02; F16H 19/025
USPC ............. 310/12, 15, 80, 83, 89, 90, 91; 74/25
IPC ....................................................... F16H 19/02
See application file for complete search history.

(56) References Cited

U.S. PATENT DOCUMENTS

| 2,603,983 | A | * | 7/1952 | Rieser | 74/640 |
|---|---|---|---|---|---|
| 4,500,805 | A | * | 2/1985 | Swanson | 310/80 |
| 4,794,284 | A | * | 12/1988 | Buon | 310/12.19 |
| 4,858,481 | A | * | 8/1989 | Abraham | 74/89.38 |
| 5,895,992 | A | * | 4/1999 | Dreher | 310/80 |
| 6,145,395 | A | * | 11/2000 | Swanson et al. | 74/89.33 |
| 6,234,034 | B1 | * | 5/2001 | Ando | 74/89.14 |
| 6,603,229 | B1 | * | 8/2003 | Toye, IV | 310/90 |
| 6,927,513 | B2 | * | 8/2005 | Schreier | 310/75 D |
| 7,677,868 | B2 | * | 3/2010 | Chaudhry et al. | 416/23 |
| 2002/0066326 | A1 | * | 6/2002 | Someya | 74/89.23 |
| 2006/0102697 | A1 | * | 5/2006 | Nagai et al. | 228/101 |
| 2007/0169578 | A1 | * | 7/2007 | Christensen et al. | 74/89.37 |
| 2008/0157607 | A1 | * | 7/2008 | Scheich et al. | 310/12 |
| 2011/0298323 | A1 | * | 12/2011 | Brieschke | 310/83 |

* cited by examiner

*Primary Examiner* — John K Kim
(74) *Attorney, Agent, or Firm* — MacMillan, Sobanski & Todd, LLC (57) ABSTRACT

A linear actuator is provided that includes a housing having an input member supported for rotation therein. An output member travels linearly along the input member when the input member is rotated relative to the output member. A guide rail extends along an inner surface of the housing. The output member engages the guide rail to prevent rotation of the output member.

14 Claims, 5 Drawing Sheets

ELECTRO-MECHANICAL ACTUATOR

CROSS-REFERENCE TO RELATED APPLICATIONS

This application claims the benefit of U.S. Provisional Application No. 61/351,335 filed Jun. 4, 2010, the disclosure of which is incorporated herein by reference.

BACKGROUND OF THE INVENTION

This invention relates in general to linear actuators, such as can be used to convert rotational power into a linear force. In particular, this invention relates to an improved linear actuator that is self-contained and well suited for high load, high speed, and high precision applications.

Electro-mechanical actuators are used in a wide variety of industrial applications such as, for example, machine presses and the like. A typical electro-mechanical actuator includes an electric motor that functions as a source of rotational power to provide torque to a linear actuator mounted adjacent thereto. The linear actuator is configured to convert the torque into a linear force. Linear actuators typically include a lead screw that is supported for rotation within a housing. The lead screw is connected for rotation with an output shaft of the electric motor, such as by a belt and pulley system. A driven nut is supported on the lead screw and has an inner diameter that corresponds with an outer diameter of the lead screw. As the lead screw is rotated relative to the driven nut, the driven nut travels linearly along a length of the lead screw, thereby converting rotational power into a linear force. A ram is secured to the driven nut for movement therewith. An end portion of the ram extends from the housing and is adapted to transfer the linear force to a desired work piece.

To prevent the driven nut from rotating with the lead screw, it is known to provide a pin on the driven nut that extends outwardly therefrom and into a groove that is provided in an inner surface of the housing. As the driven nut travels along the lead screw, the pin engages side walls of the groove to prevent rotation of the driven nut. However, it has been found that such a design may not be optimal for applications involving high press loads, increased ram speeds, or high precision. It is also know to provide an external guidance system on the linear actuator. Such a system may include a plurality of support rods that extend from the housing along a desired path of the ram. A support bracket is secured to an end portion of the ram and adapted to guide the ram along the support rods. However, this configuration typically involves bulky components extending from the linear actuator that may be exposed to undesirable environments. Thus, it would be desirable to provide an improved linear actuator that is self-contained and well suited for high load, high speed, and high precision applications.

SUMMARY OF THE INVENTION

This invention relates to a linear actuator that includes a housing having an input member supported for rotation therein. An output member travels linearly along the input member when the input member is rotated relative to the output member. A guide rail extends along an inner surface of the housing. The output member engages the guide rail to prevent rotation of the output member.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
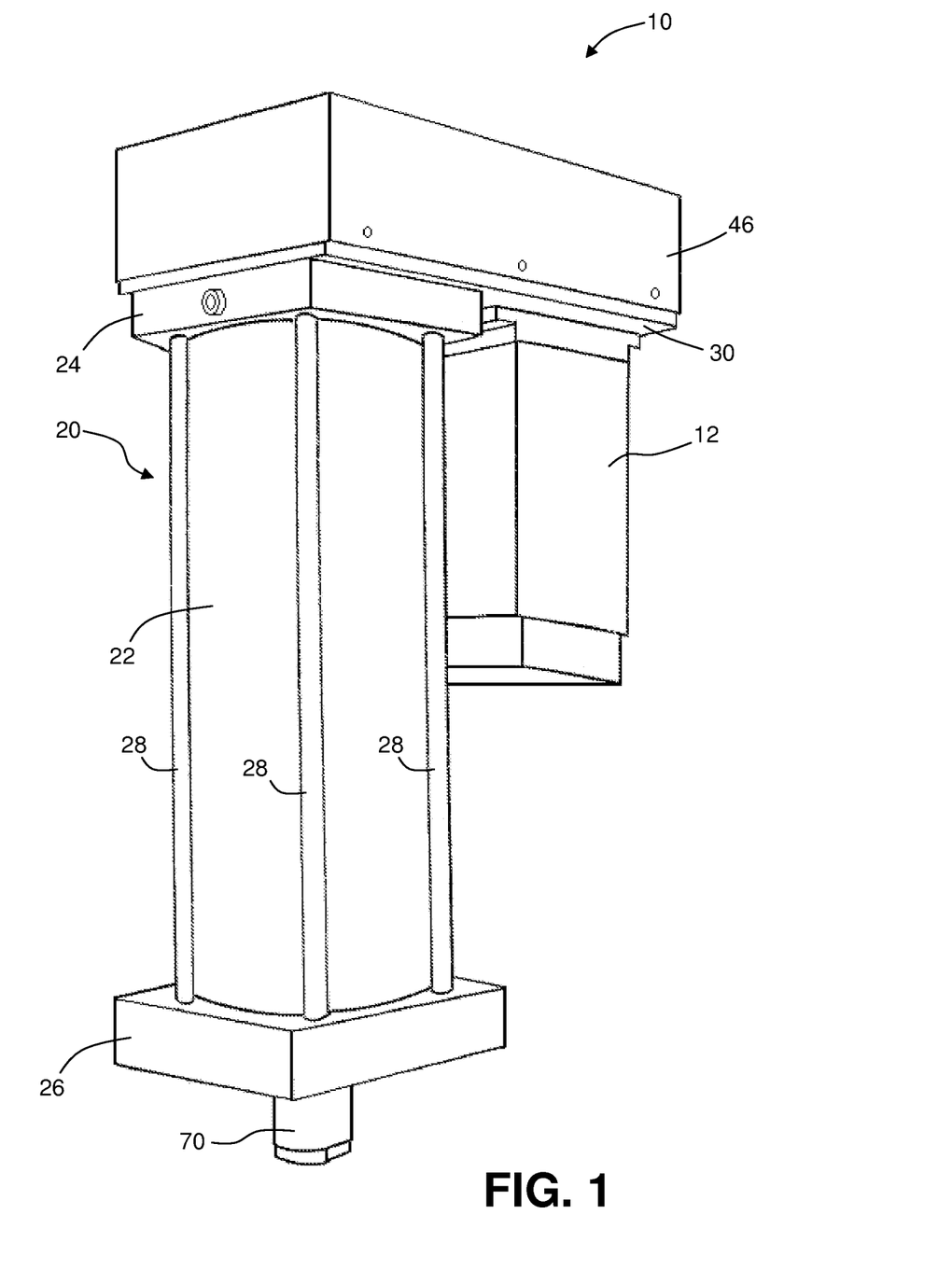
FIG. 1 is a perspective view of an electro-mechanical actuator that includes a linear actuator and a motor in accordance with this invention.

Referring now to the drawings, there is illustrated in FIG. 1 an electro-mechanical actuator, indicated generally at 10, in accordance with this invention. The electro-mechanical actuator 10 may be used in a wide variety of applications such as, for example, machine presses and the like. The illustrated electro-mechanical actuator 10 includes a motor 12 and a linear actuator 20 that are supported adjacent to one another on a mounting plate 30. The motor 12 is configured to function as a source of rotational power to provide torque to the linear actuator 20. The linear actuator 20 converts the torque into a linear force, as will be explained below. Although the electro-mechanical actuator 10 will be described and illustrated in the context of a machine press, it should be appreciated that the electro-mechanical actuator 10 may be used in any desired environment and for any desired purpose.

The motor 12 can be any apparatus that is configured to provide rotational power to the linear actuator 20, such as an alternating current or direct current electric motor. The motor 12 may also be embodied as a servo motor that is adapted to be automatically controlled by a closed loop control system (not shown). For example, the motor 12 can be controlled in response to any operating parameter of the electro-mechanical actuator 10, such as speed, travel, or press force produced by the linear actuator 20. Alternatively, the motor 12 can be otherwise operated in any suitable manner including but not limited to manual operation.

Figure 2:
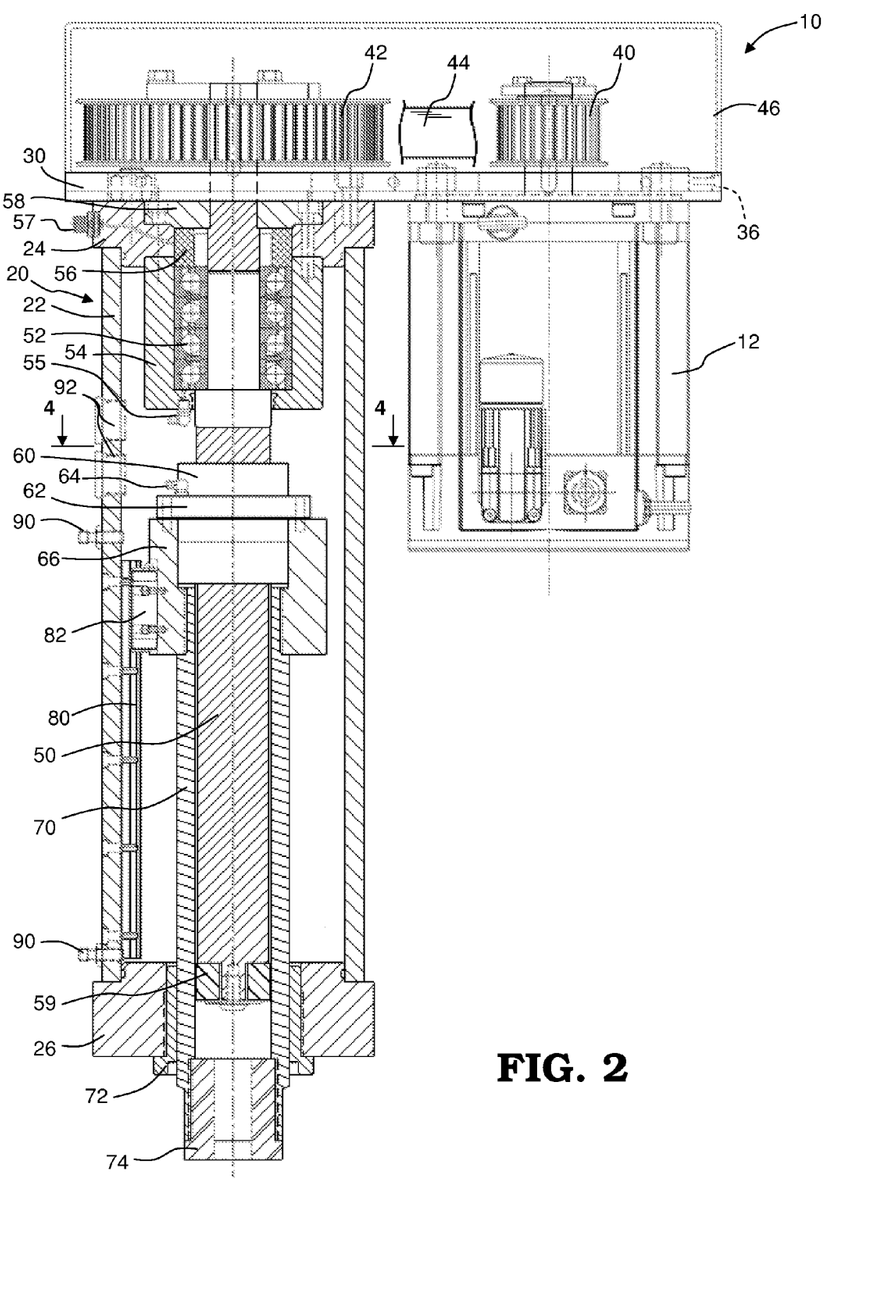
FIG. 2 is a cross-sectional front view of the electro-mechanical actuator shown in FIG. 1.

Referring now to FIG. 2, the illustrated motor 12 and linear actuator 20 are separately secured to the mounting plate 30 and extend downwardly therefrom. It should be appreciated, however, that the motor 12 and the linear actuator 20 can be otherwise configured in any manner relative to the mounting plate 30 or to one another for a desired application. For example, the motor 12 and the linear actuator 20 may be individually mounted to separate support members, may extend in opposite directions, or may be mounted together within a housing if so desired.

The illustrated mounting plate 30 is a generally flat member that includes a plurality of thru-holes for securing the motor 12 and the linear actuator 20 thereto. For example, the motor 12 and the linear actuator 20 can be secured to the mounting plate 30 by a plurality of threaded fasteners, although such is not necessarily required. The mounting plate 30 may optionally include stepped portions, recessed portions, or any other structural features to facilitate securing the motor 12 and the linear actuator 20 thereto. The mounting plate 30 will be further described below.

As briefly described above, the motor 12 is adapted to provide torque to the linear actuator 20. To accomplish this, the motor 12 includes an output shaft that extends upwardly through a first aperture formed in the mounting plate 30. A drive pulley 40 can be secured to an end portion of the output shaft. As will be described below, a lead screw 50 is supported for rotation within the linear actuator 20 and a portion thereof extends upwardly through a second aperture formed in the mounting plate 30. A driven pulley 42 can be secured to an end portion of the lead screw 50. A drive belt 44 connects the driven pulley 42 for rotation with the drive pulley 40. For example, the illustrated drive belt 44 is a cog-style belt that is, in large part, conventional in the art and includes teeth or notches that are adapted to engage outer diameters of the drive and driven pulleys 40, 42 in mating fashion. Alternatively, the electro-mechanical actuator 10 may include a V-belt, grooved belt, or a chain and sprocket configuration. It should also be appreciated that the electro-mechanical actuator 10 may incorporate any other system that is configured to transfer rotational power from the motor 12 to the linear actuator 20, such as a plurality of meshed gears or the like.

Figure 3:
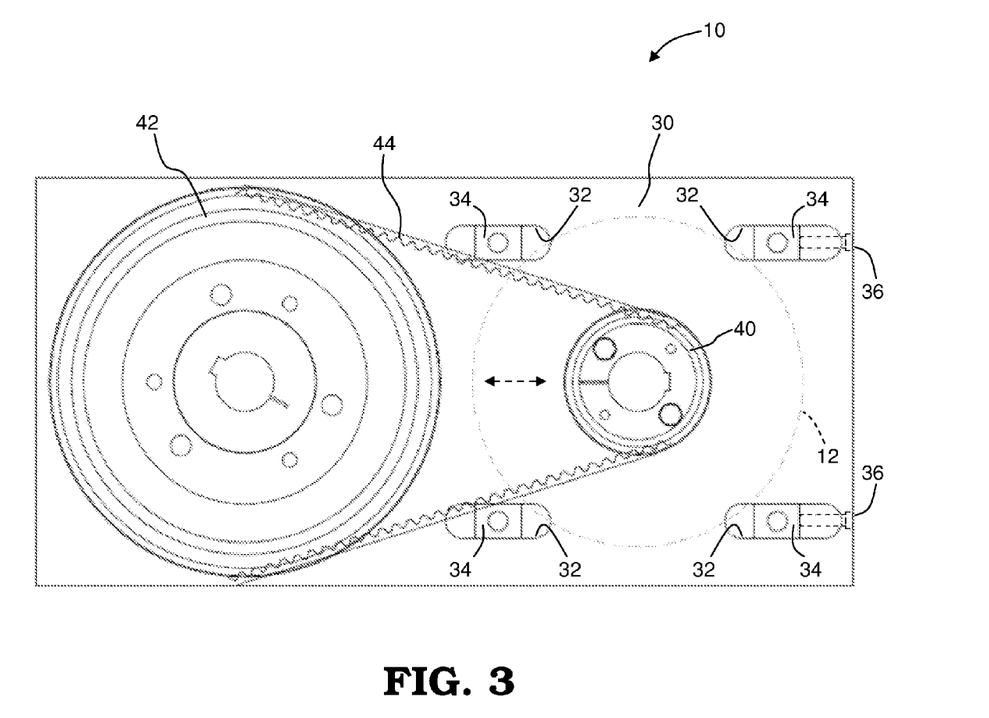
FIG. 3 is a top plan view of the electro-mechanical actuator shown in FIG. 1 with a protective cover removed.

As shown in FIG. 3, the illustrated motor 12 is adjustably secured to the mounting plate 30 for lateral movement relative to the linear actuator 20, as indicated by the broken arrow. This enables the drive pulley 40 to be moved towards the driven pulley 42 to facilitate installation of the drive belt 44. Once the drive belt 44 is installed, the motor 12 can be moved relative to the linear actuator 20 to increase or decrease tension in the drive belt 44 for an intended application.

For example, the illustrated mounting plate 30 includes a plurality of slots 32 that extend in a lateral direction relative to the linear actuator 20. The slots 32 are configured to individually receive fasteners 34 that are used to secure the motor 12 to the mounting plate 30. The fasteners 34 can be threaded nuts or any other fastening components. The fasteners 34 are permitted to travel within the slots 32 when the fasteners 34 are not securely fastened against the mounting plate 30. This allows the motor 12 to move in a lateral direction relative to the linear actuator 20. Once the motor 12 is in the desired position, the fasteners 34 can be fastened against the mounting plate 30 to prevent movement of the motor 12 relative to the linear actuator 20. The linear actuator 20 may alternatively (or additionally) be adjustably secured to the mounting plate 30 in a similar manner if so desired. It should be appreciated that the motor 12 and the linear actuator 20 may be adjustable in any other manner.

The illustrated mounting plate 30 also includes a precision belt tension adjustment feature, although such is not required. As shown, a pair of adjustment pins 36 is individually inserted into respective apertures that extend into an edge of the mounting plate 30, although any number of adjustments pins 36 may be used. The apertures communicate with the slots 32 that are located nearest the edge of the mounting plate 30. The adjustment pins 36 may be threaded within the apertures and can extend into the slots 32 for engagement with the fasteners 34. Accordingly, the adjustment pins 36 can be moved relative to the slots 32 to selectively control the position of the motor 12 relative to the linear actuator 20. In turn, this allows the drive pulley 40 to be selectively positioned relative to the driven pulley 42 to achieve a desired tension in the drive belt 44. It should be appreciated that the adjustment pins 36 can be configured to engage any portion of the motor 12 or fastening members thereof. Further, the adjustment pins 36 may alternatively be embodied as any structures that are configured to accomplish the purposes described herein.

Referring back to FIG. 2, a protective cover 46 may be attached to the mounting plate 30 so as to enclose the drive and driven pulleys 40, 42 and the drive belt 44, although such is not required. The protective cover 46 is, in large measure, conventional in the art and can be any structure that is configured to prevent contact with the drive and driven pulleys 40, 42 or contamination of the drive belt 44. The illustrated protective cover 46 is secured to the mounting plate 30 by a plurality of fasteners, but can otherwise be secured thereto in any manner.

The linear actuator 20 will now be described with reference to FIGS. 1 and 2. As shown, the linear actuator 20 includes a housing 22. The illustrated housing 22 is a hollow, cylindrical structure having openings at opposite ends thereof. For example, the housing 22 can be a high strength, heavy walled steel tube member if so desired. It should be appreciated, however, that the housing 22 can be any structural member that is configured to accomplish the functions described below.

The illustrated housing 22 includes a cylinder base 24 secured to a first end thereof and a cylinder head 26 secured to a second end thereof. The cylinder base 24 and the cylinder head 26 can be generally flat members that are configured to enclose the open ends of the housing 22. The cylinder base 24 and the cylinder head 26 may optionally include a stepped portion that is configured to be press-fit or otherwise inserted into the open ends of the housing 22 to provide radial support for the housing 22. A seal (not shown) or the like can be disposed between each of the stepped portions and an inner surface of the housing 22 to provided a sealed connection therebetween. The cylinder base 24 and the cylinder head 26 may include any structural features or have any shape for a desired application.

The illustrated cylinder base 24 and cylinder head 26 are secured to the housing 22 by a plurality of tie rods 28 that extend therebetween. Thus, the cylinder base 24 and the cylinder head 26 may each define an outer flange portion that is configured to receive and secure end portions of the tie rods 28 thereto. For example, the cylinder base 24 and the cylinder head 26 may include threaded apertures or thru-holes if so desired. It should be appreciated, however, that the cylinder base 24 and the cylinder head 26 can be secured to the housing 22 in any suitable manner, such as by a welded or threaded connection for example.

As shown in FIG. 2, the illustrated cylinder base 24 is configured to secure the linear actuator 20 to the mounting plate 30. Thus, the cylinder base 24 may include any structural features that are configured to engage a surface of the mounting plate 30 in mating fashion, such as a stepped portion or alignments pins for example. The cylinder base 24 may also include a plurality of thru-holes that are adapted to receive fasteners therein to secure the linear actuator 20 to the mounting plate 30. It should be appreciated, however, that the cylinder base 24 can be secured to the mounting plate 30 in any manner, such as by a welded or threaded connection for example. The cylinder base 24 also includes an aperture that extends therethrough, the purpose of which will be explained below.

The illustrated linear actuator 20 also includes the input member or lead screw 50 that is supported for rotation therein. The lead screw 50 may be a generally elongated member that axially extends within the housing 22. An outer diameter of the lead screw 50 may include a threaded portion, a grooved portion, or any other formed surface, the purposes of which will be explained below. It should be fully appreciated that the lead screw 50 can have any length or diameter and may include any structural features so as to accomplish the functions described herein and below.

As shown, a proximal end of the lead screw 50 extends from the first end of the housing 22 through respective apertures formed in both the cylinder base 24 and the mounting plate 30. This arrangement enables the driven pulley 42 to be secured to the lead screw 50 and provide rotational power from the motor 12 to the linear actuator 20, as explained above. The driven pulley 42 can be secured to the lead screw 50 in any manner, including but not limited to a press-fit connection, a key-way, a splined connection, a plurality of fasteners, or any combination thereof.

A first end of the lead screw 50 can be supported for rotation within the housing 22 by a bearing pack 52. The illustrated bearing pack 52 includes four high capacity ball bearing assemblies mounted axially adjacent one another. However, the bearing pack 52 may include any number or configuration of bearing assemblies. Alternatively, the bearing pack 52 can be embodied as any other structure that is adapted to support the first end of the lead screw 50 for rotation within the housing 22.

The illustrated bearing pack 52 is supported within a bearing housing 54, although such is not required. The bearing housing 54 can be a generally cylindrical member having an opening at a first end and an end wall at a second end thereof. The bearing pack 52 can be press-fit or otherwise received within the bearing housing 54 through the open end. The open end of the bearing housing 52 may then be secured to the cylinder base 24 in any suitable manner so as to enclose and support the bearing pack 52 relative thereto. As shown, the lead screw 50 extends through an aperture that is formed in the end wall of the bearing housing 54. A seal (not shown) or the like can optionally be disposed within the aperture and configured to engage an outer surface of the lead screw 50. Further, the bearing housing 54 may include a fitting 55 attached thereto in order to provide a supply of lubrication to the bearing pack 52, although such is not required.

The illustrated linear actuator 20 also includes a load cell 56, although such is not required. The load cell 56 can be any component that is configured to measure the linear force (i.e. press force) produced by the linear actuator 20. For example, the load cell 56 may be a transducer having an arrangement of strain gauges that are adapted to sense the linear force in the lead screw 50. The load cell 56 may also be configured to compensate for temperature variations of the linear actuator 20 if so desired.

The load cell 56 may also be adapted to convert the sensed force into an output signal representative of the measured force. The output signal can be sent to an encoder (not shown) which, in turn, is adapted to control operation of the motor 12 as described above. The linear actuator 20 may optionally include an electrical connector 57 that is attached to an outer surface thereof to provide an electrical connection with the load cell 56. As shown, the load cell 56 is supported relative to the lead screw 50 and is located axially adjacent the bearing pack 52 nearest the first end of the lead screw 50. However, the load cell 56 can be located along any portion of the lead screw 50 as desired.

The illustrated load cell 56 is supported relative to the lead screw 50 by a retaining member 58. The retaining member 58 can be a plate-like structure that includes an aperture formed therein through which the lead screw 50 extends. The illustrated retaining member 58 is mounted to the cylinder base 24 for securing the load cell 56 axially adjacent to the bearing pack 52 and within the aperture formed in the cylinder base 24. The retaining member 58 may also include any number of thru-holes for receiving fasteners therein to secure the retaining member 58 and the bearing housing 54 to the cylinder base 24. It should be fully appreciated that the retaining member 58 is not required or, alternatively, can be configured in any other manner for a desired application.

A second end of the lead screw 50 is supported for rotation within the housing 22 by a shaft bearing 59. As will be described below, the second end of the lead screw 50 extends into an internal portion of a ram 70 that is adapted to move in an axial fashion relative to the lead screw 50. Thus, the shaft bearing 59 can be any structure that is capable of rotatably supporting the second end of the lead screw 50 within the ram 70. In one non-limiting example, the shaft bearing 59 can be a resinous or laminate composite bearing. In another example, the shaft bearing 59 can be made of ultra-high molecular weight (UHMW) polyethylene. The illustrated shaft bearing 59 is secured to the end of the lead screw 50 by a washer and fastener, although any fastening arrangement may be used. It should be appreciated, however, that the second end of the lead screw 50 can be supported for rotation within the housing 22 in any manner.

As described above, the linear actuator 20 is configured to torque into a linear force. To accomplish this, the linear actuator 20 may also include an output member or nut assembly 60 that is supported on an outer surface of the lead screw 50. When the lead screw 50 is rotated relative to the nut assembly 60, the nut assembly 60 is configured to travel linearly along a length of the lead screw 50, thereby producing a linear force.

It should be fully appreciated that the nut assembly 60 and the lead screw 50 can be configured in any manner to convert rotational power into a linear force. For example, the nut assembly 60 and the lead screw 50 may be configured as a roller screw. In this embodiment, the nut assembly 60 includes a plurality of rollers (not shown) that are circumferentially spaced about an inner diameter thereof. The rollers each include a threaded outer diameter this is configured to correspond with and engage a threaded portion (not shown) formed along an outer surface of the lead screw 50. Thus, as the lead screw 50 is rotated, the threaded portion of the lead screw 50 applies an axial force on the rollers thereby moving the nut assembly 60 in a linear direction. In another example, the nut assembly 60 and the lead screw 50 may be configured as a ball screw. In this embodiment, the nut assembly 60 includes a plurality of balls (not shown) circumferentially spaced about an inner diameter thereof. The balls are configured to correspond with and ride along spiral grooves (not shown) that are formed along an outer surface of the lead screw 50. Thus, as the lead screw 50 is rotated, the spiral grooves apply an axial force on the balls thereby moving the nut assembly 60 in a linear direction.

Figure 4:
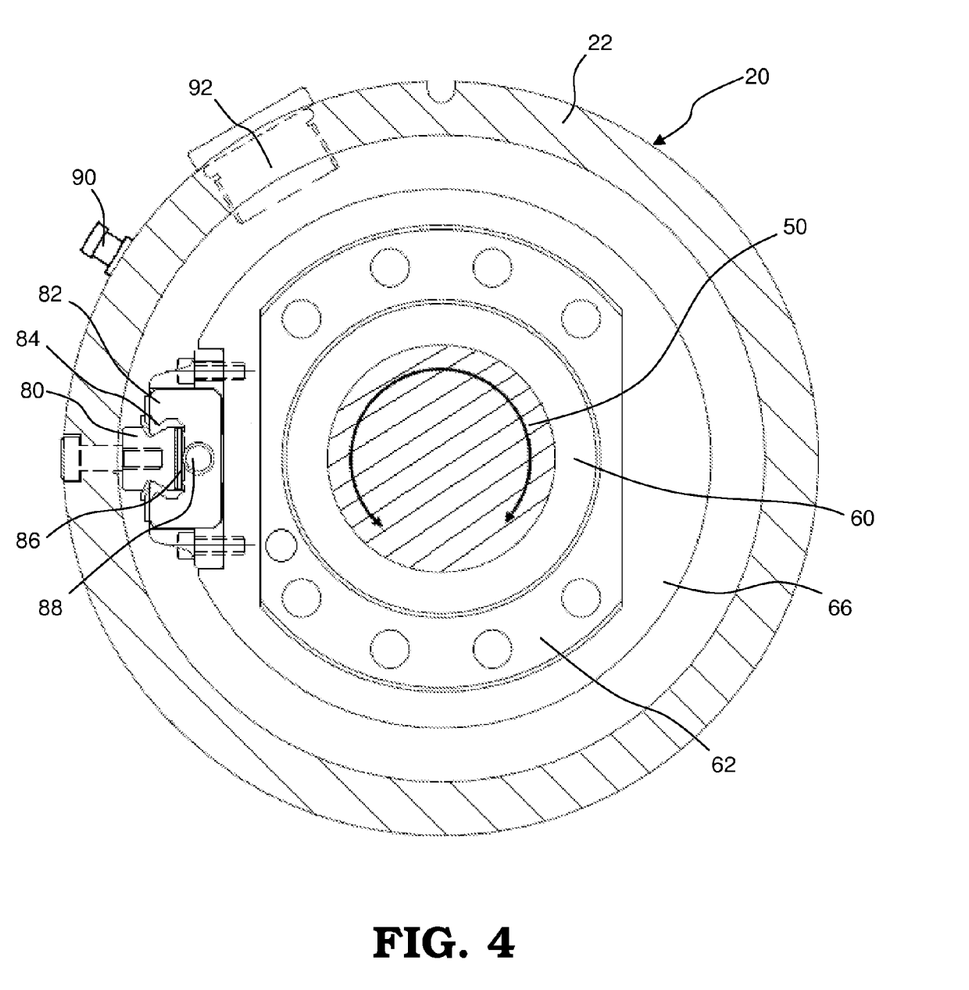
FIG. 4 is a cross-sectional end view of the linear actuator taken along section line 4-4 shown in FIG. 2.

The nut assembly 60 may optionally include an outwardly extending flange portion 62 for securing a nut adaptor 66 thereto, which will be explained below. As shown in FIGS. 2 and 4, the flange portion 62 can define any number of thru-holes or the like for receiving fasteners therein. It should be appreciated, however, that the nut assembly 60 may include any structural features to accomplish the purposes described herein and below. Further, the nut assembly 60 may include a fitting 64 to provide a supply of lubrication to an internal portion thereof.

As shown in FIG. 2, the nut adaptor 66 may be a generally cylindrical member having openings at both ends. A first end of the nut adaptor 66 can be positioned over an outer diameter of the nut assembly 60 for engagement with the flange portion 62. The nut adaptor 66 is then secured to the nut assembly 60 by a plurality of fasteners that extend through the flange portion 62. Alternatively, the nut adaptor 66 can be secured to the nut assembly 60 in any suitable manner, including but not limited to a threaded connection or a welded connection for example.

The illustrated linear actuator 20 also includes the ram 70 that is secured to the nut assembly 60. The ram 70 can be configured to transfer linear force produced by the nut assembly 60 to a desired work piece (not shown). The illustrated ram 70 is a generally elongated, cylindrical member having openings at both ends thereof. A first end of the ram 70 can be received within or otherwise secured to a second end of the nut adaptor 66. The ram 70 may be secured to the nut adaptor 66 in any suitable manner, including but not limited to a threaded connection, a splined connection, a press-fit connection, or the like. The illustrated ram 70 is a heavy walled, steel structure having ground and polished inner and outer surfaces that are adapted to resist corrosion and reduce surface friction, as will become apparent. However, it should be appreciated that the ram 70 can be any structure that is formed from any desired material. The ram 70 may also be integrally formed with the nut assembly 60 or any portion thereof, such as the nut adaptor 66 if so desired.

As shown in FIG. 2, the second end of the lead screw 50 extends into an internal region of the ram 70. The shaft bearing 59 is configured to support the second end of the lead screw 50 for rotation within the ram 70. The shaft bearing 59 also allows the ram 70 to axially move relative to the lead screw 50, as briefly described above. It should be appreciated that the shaft bearing 59 and the inner surface of the ram 70 can be configured in any manner to minimize friction therebetween.

The second end of the ram 70 axially extends through an aperture formed in the cylinder head 26. Thus, the illustrated linear actuator 20 also includes a bushing 72 that is disposed within the aperture of the cylinder head 26, although such is not required. The bushing 72 can be any structure that is adapted to facilitate axial movement of the ram 70 relative to the cylinder head 26 and to provide lateral support to the ram 70. For example, the bushing 72 can be a sleeve-like structure that is formed of bronze, copper, or any other desired material. Alternatively, the bushing 72 may include any moveable bearing components if so desired. The bushing 72 may also include a wiper seal (not shown) or the like that is configured to ride along an outer surface of the ram 70 and remove debris therefrom that may otherwise contaminate the linear actuator 20.

The ram 70 may optionally include a ram head 74 secured to a second end thereof. The ram head 74 is, in large part, conventional in the art. For example, the ram head 74 can be embodied as any desired tool piece, such as a press tool, a piercing tool, a joining tool, or the like. The ram head 74 may be secured to the ram 72 in any suitable manner, including but not limited to a threaded connection, a splined connection, or a press-fit connection.

As shown in FIGS. 2 and 4, the illustrated linear actuator 20 also includes an internal guide rail system that is configured to prevent the nut assembly 60 from rotating with the lead screw 50 and to maintain precise orientation of the nut assembly 60. The guide rail system includes a rail 80 that is secured to an inner surface of the housing 22 and a guide 82 that is secured to the nut assembly 60. The guide 82 is adapted to freely slide along the rail 80 as the nut assembly 60 travels along the rotating lead screw 50, as will be explained below.

The illustrated rail 80 extends parallel with the lead screw 50 along the inner surface of the housing 22. It should be appreciated that the rail 80 can have any length or may extend along any portion of the housing 22. The illustrated rail 80 defines a dove tail cross-sectional shape, the purposes of which will be explained below. Alternatively, the rail 80 may define other cross-sectional shapes, including but not limited to a circular shape, an oval shape, or any polygonal shape if so desired.

As shown, the rail 80 is secured to the housing 22 by a plurality of fasteners that extend through a wall of the housing 22 for engagement with apertures formed in the rail 80. The rail 80 may, however, be secured to the inner surface of the housing 22 in any manner, including but not limited to a welded connection, a tongue-and-groove connection, or may be integrally formed with the housing 22. Further, the rail 80 can be made from any suitable material, such as stainless steel or high strength aluminum alloys for example.

The illustrated guide 82 is mounted to the nut adaptor 66. To accomplish this, the nut adaptor 66 may define a generally flat surface that the guide 82 is secured to by a plurality of fasteners or the like. Alternatively, the guide 82 may be mounted to or integrally formed with any portion of the nut assembly 60 or the ram 70 if so desired. The illustrated guide 82 defines a saddle-like structure having a cross-sectional shape that generally corresponds with the cross-sectional shape of the rail 80. For example, the guide 82 defines a dove tail cross-sectional shape that is configured to receive the rail 80 in mating fashion. Alternatively, the guide 82 may define other cross-sectional shapes, including but not limited to a circular shape, an oval shape, or any polygonal shape if so desired. It should also be appreciated that the cross-sectional shape of the guide 82 need not correspond with the cross-sectional shape of the rail 80.

The guide 82 may also include other structural features or components as desired. In one example, the guide 82 may optionally include guide bushings 84 that are disposed between the guide 82 and the rail 80 to facilitate sliding movement and maintain proper orientation of the nut assembly 60. The guide bushings 84 can be formed from any material that minimizes friction with the rail 80. In another example, the guide 82 may optionally include bearing elements 86 that are configured to engage a surface of the rail 80, such as rollers, needles, or balls for example. The illustrated guide 82 also includes a fitting 88 or the like that is adapted to provide lubrication to the guide 82, but is not required. The guide 82 can be made from any suitable material, such as stainless steel or high strength aluminum alloys for example.

Referring back to FIG. 2, the illustrated linear actuator 20 also includes a pair of proximity sensors 90 secured to the housing 22, although such is not required. The proximity sensors 90 can be located near opposite ends of the housing 22 or along any desired length or portion thereof. The proximity sensors 90 can be configured to provide an output signal to a controller (not shown) when the linear actuator 20 reaches an end-of-stroke position, such as when the ram 72 is fully retracted or fully extended for example. The proximity sensors 90 may be any device that is capable of detecting the presence or position of an object, including but not limited to inductive sensors or the like. Further, it should be appreciated that the linear actuator 20 may include any number of proximity sensors 90 as desired.

The illustrated linear actuator 20 also includes a plurality of lubrication ports 92 that extend through a portion of the housing 22, although such are not required. The lubrication ports 92 may be configured to provide access to the fittings 55, 64, and 88 for lubrication of the respective components. The lubrication ports 92 may also include protective plugs or the like adapted to be inserted therein to prevent contamination of the linear actuator 20.

Figure 5:
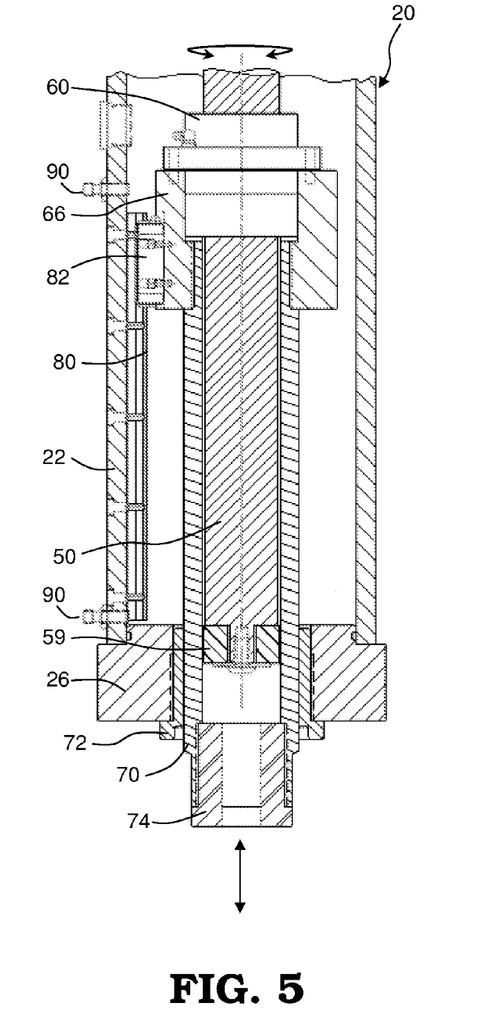
FIG. 5 is a cross-sectional front view of a portion of the linear actuator shown in FIG. 2, illustrated in a retracted position.
Figure 6:
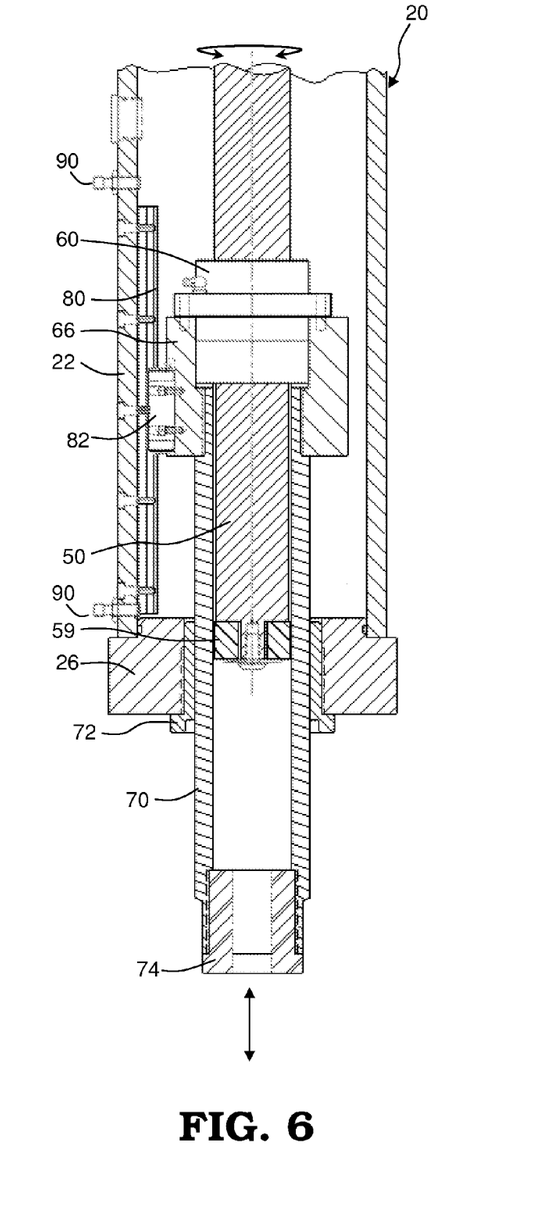
FIG. 6 is a cross-sectional front view of a portion of the linear actuator shown in FIG. 2, illustrated in a partially extended position.

Referring now to FIGS. 5 and 6, the linear actuator 20 will be described in operation. As shown in FIG. 5, the linear actuator 20 is in a retracted position. In this position, the nut assembly 60 is located near a first end of the housing 22 such that a reduced length of the ram 70 extends from the cylinder head 26. The illustrated proximity sensor 90 nearest the first end of the housing 22 detects the presence of the nut assembly 60 and provides an output signal to a controller (not shown) indicating that the linear actuator 20 is in a first end-of-travel or retracted position. As shown, the illustrated guide 82 is also located near a first end of the rail 80.

During operation of the electro-mechanical actuator 10, the motor 12 (not shown) provides torque to the linear actuator 20 for rotation of the lead screw 50. As shown in FIG. 6 and explained above, the nut assembly 60 is configured to travel in a linear fashion along a length of the rotating lead screw 50. In turn, the ram 70 is also moved by the nut assembly 60 in a linear fashion relative to lead screw 50. For example, when the lead screw 50 is rotated in a first direction, the ram 70 extends from the second end of the housing 22. Conversely, when the lead screw 50 is rotated in a second or opposite direction, the ram 70 retracts within the housing 22. Thus, the illustrated electro-mechanical actuator 10 can be configured to provide a compressive force or tensile force on the desired work piece as desired.

The nut assembly 60 may be adapted to travel along any length or portion of the lead screw 50 as desired. For example, the ram 70 may be extended from the housing 22 until the illustrated proximity sensor 90 located nearest the cylinder head 26 detects the presence of the nut assembly 60. The proximity sensor 90 provides an output signal to the controller (not shown) indicating that the linear actuator 20 has reached a second end-of-travel or extended position.

As the nut assembly 60 travels along the lead screw 50, the illustrated guide 82 also travels along the rail 80 preventing the nut assembly 60 from rotating with the lead screw 50. It should be appreciated that the illustrated linear actuator 20 is well suited for high load, high speed, and high precision applications. Further, the illustrated linear actuator 20 eliminates or reduces the need for an external guidance system that may otherwise be used in these types of applications.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A linear actuator comprising:
    a housing;
    an input member that is supported for rotation within the housing;
    an output member that travels linearly along the input member when the input member is rotated relative to the output member;
    a guide rail that extends along an inner surface of the housing, wherein the output member engages the guide rail to prevent rotation of the output member; and
    a mounting plate and a motor, wherein the linear actuator and the motor are supported on the mounting plate relative to one another, and wherein a position of the motor is adjustable relative to the linear actuator;
    wherein the mounting plate includes at least one adjustment pin that selectively controls the position of the motor relative to the linear actuator; and
    wherein the mounting plate includes a plurality of slots with fasteners disposed therein for adjustably supporting the motor on the mounting plate, and the at least one adjustment pin extends into one of the slots for engagement with the respective fastener.

2. The linear actuator of claim 1, wherein the guide rail is secured to the inner surface of the housing by a plurality of fasteners.

3. The linear actuator of claim 1, wherein the output member receives the guide rail in mating fashion.

4. The linear actuator of claim 3, wherein the output member defines a cross-sectional shape that corresponds in mating fashion with a cross-sectional shape of the guide rail.

5. The linear actuator of claim 4, wherein the output member and the guide rail define a mating dove-tail shaped configuration.

6. The linear actuator of claim 1, wherein the output member includes a guide that engages the guide rail.

7. The linear actuator of claim 6, wherein the guide receives the guide rail in mating fashion.

8. The linear actuator of claim 7, wherein the guide defines a cross-sectional shape that corresponds in mating fashion with a cross-sectional shape of the guide rail.

9. The linear actuator of claim 8, wherein the guide and the guide rail define a mating dove-tail shaped configuration.

10. The linear actuator of claim 6, wherein the guide is secured to an outer surface of the output member.

11. The linear actuator of claim 6, wherein the guide includes at least one bearing element that is disposed between the guide rail and the guide.

12. The linear actuator of claim 6, wherein the guide includes at least one guide bushing that is disposed between the guide rail and the guide.

13. The linear actuator of claim 6, wherein the guide includes a fitting that is adapted to provide lubrication between the guide rail and the guide.

14. The linear actuator of claim 1, wherein the at least one adjustment pin is disposed within a threaded aperture that extends into an edge of the mounting plate.

* * * * *